United States Patent [19]

Chikuma et al.

[11] Patent Number: 4,846,589
[45] Date of Patent: Jul. 11, 1989

[54] SCANNING CARRIAGE SYSTEM USEFUL FOR OPTICAL SCANNERS

[75] Inventors: Tom K. Chikuma, Fort Lupton; Rick O. Jones, Longmont; William H. Nelson, Louisville; Walter F. Price, Jr., Longmont, all of Colo.

[73] Assignee: International Business Machines Corporation, Armonk, N.Y.

[21] Appl. No.: 187,625

[22] Filed: Apr. 28, 1988

[51] Int. Cl.4 .................. F16C 19/00; F16C 29/04
[52] U.S. Cl. .......................... 384/50; 384/53; 384/54; 384/55; 384/58
[58] Field of Search .......... 384/7, 9, 10, 19, 47, 384/49–59

[56] References Cited

U.S. PATENT DOCUMENTS

| | | | |
|---|---|---|---|
| 649,121 | 5/1900 | Wise | 384/57 |
| 1,923,853 | 8/1933 | van Duyn | 384/49 |
| 2,598,251 | 5/1952 | Gesner | 384/58 |
| 2,602,710 | 7/1952 | Gesner | 384/55 |
| 3,661,431 | 5/1972 | Wisecarver . | |
| 4,593,957 | 6/1986 | Hidano | 384/49 |
| 4,634,267 | 1/1987 | Jones et al. | 355/66 |

FOREIGN PATENT DOCUMENTS 834161 3/1952 Fed. Rep. of Germany ........ 384/58

Primary Examiner—Thomas R. Hannon
Attorney, Agent, or Firm—Earl C. Hancock; Charles E. Rohrer

[57] ABSTRACT

Two carriages are roller mounted to allow relative motion between them while maintaining precise relative positioning. Rollers engage precision ground spaced surfaces of a C-shaped hangar configuration, and wear compensation is provided by a spring bias arrangement maintaining conformity between the rollers and guide grooves in the underside of the rails.

8 Claims, 3 Drawing Sheets

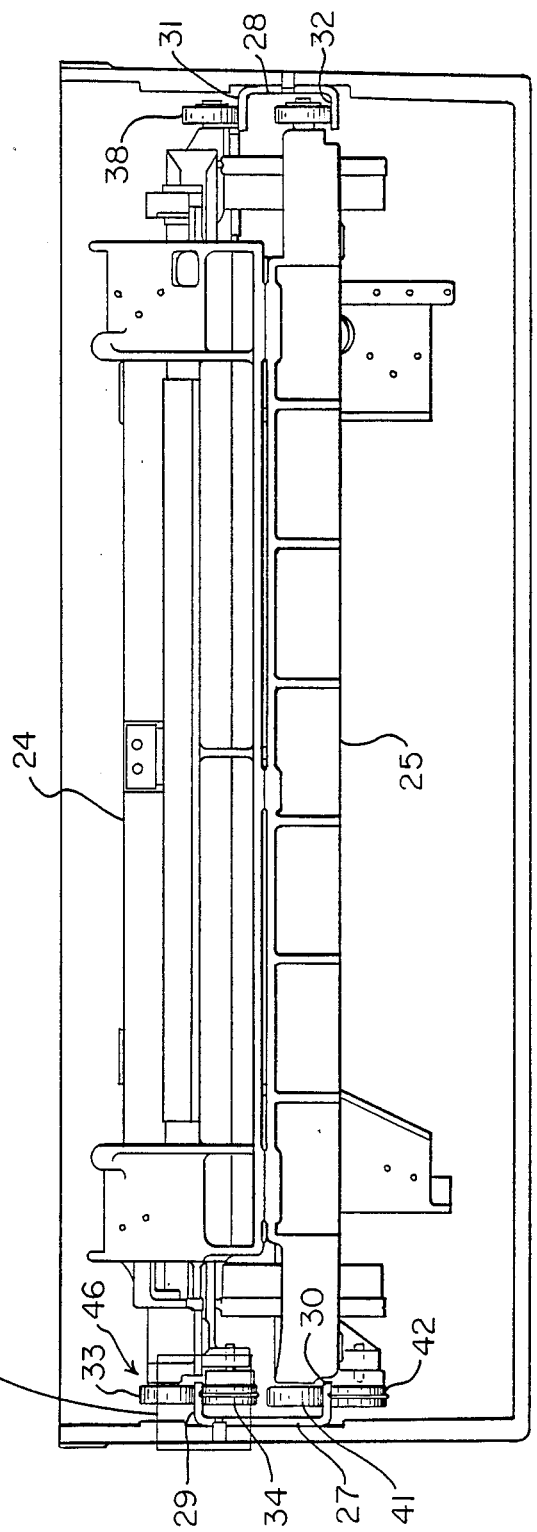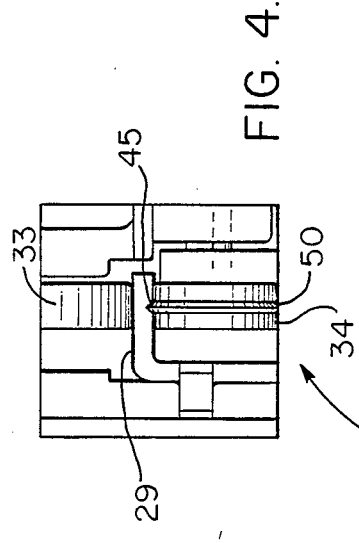

SCANNING CARRIAGE SYSTEM USEFUL FOR OPTICAL SCANNERS

TECHNICAL FIELD

The present invention relates to methods and apparatus for mounting movable carriage systems. More particularly, the present invention relates to apparatus for mounting multiple carriages so as to maintain precise relative positioning therebetween despite wear from continued use. The present invention is especially useful for the mirror carriages associated with the folded optical scanners employed in copiers, optical readers and the like.

BACKGROUND OF THE INVENTION

Ball bearing mounts to retain two devices in generally fixed position despite relative movement between the objects are well known. For instance, U.S. Pat. No. 4,593,957 by Hidano shows an arrangement of mating grooves on telescoped channel shaped members which hold ball bearings in machined grooves to provide a load bearing mount while accommodating rectilinear movement between a table and bed. In Hidano, a roller bearing is used for carriage mounting and accommodating relative movement. A rail of a C or U-shaped cross section carries within it two track grooves; similarly, a second channel shaped rail on the carriage carries V-shaped grooves within it. Ball bearings are positioned within the V-shaped grooves between the two channel shaped rails. In this arrangement, point contact is provided between the ball bearings and the V-shaped grooves so that, over a course of time, flats are worn into the ball bearings and into the grooves. As a result, both dimensional stability and parallelism are lost.

Another arrangement for guide wheels and tracks to allow relative motion between two members is shown in U.S. Pat. No. 3,661,431 by Wisecarver wherein bearing wheels have V-shaped circumferential grooves and sloped sides to mate both sides of an inverted V-shaped track, or to run on V-shaped tracks mating with the grooves. That is, Wisecarver relates to an angle track which makes contact with two grooved rollers, one on each side of the angle. The arrangement is obviously a problem in copier scanning mechanisms because of point contacts which wear between the mating surface of the rail and roller.

The aforementioned prior art does not suggest a single C-shaped rail with a tracking surface on the flat side and a grooved surface for controlling positioning on the underside, nor does this prior art relate to copiers and the problems associated with scanning carriages in related devices.

Contemporary dual carriage copier and scanner machines typically use shafts of a circular cross section with three or more ball bearings journaled around the shaft to make contact therewith. The result is a point contact at the three intersections of the shaft and the ball bearings. Over the course of time, both the shaft and the bearings form flat spots at the point of contact bringing about a change in the carriage position. Additionally, the machining operations of the shafts is such as to provide small grooves which are perpendicular to the scanning direction. Thus, as the bearings roll over the shaft, there is considerable noise particularly when the machine is new. Typically, in prior art copiers and scanners, both carriages ride on the same rail such that one carriage is nested within the other carriage.

None of the known prior art allows for precision mounting of a carriage so that wear is accommodated and predictable tracking of the carriage position is obtained. Further, none of the prior art carriage mounts for multiple carriage systems allow relative motion between the carriage beds with wear accommodation so that the carriage beds between two mounted carriages are moveable with precise location relative to one another, as is taught by this invention.

DISCLOSURE OF THE INVENTION

The present invention is a method and means for precision mounting of carriages, and is especially useful for providing an arrangement for guiding mirror carriages in a scanning optic system. Preferably, two machined sheet metal stampings provide bearing surfaces for the mirror carriage, and a special bearing to guide the carriages.

The present invention maintains parallelism with two simultaneously ground surfaces and directionality with a machined groove. A bearing is spring loaded and rides in the machined groove. The parallelism and tracking criteria for carriage mounts have traditionally found implementation by using one or two precision ground shafts with five or six bearings per carriage in a triangular pattern around the shaft.

In multiple carriage use, the present invention is an arrangement for mounting the carriages for relative motion therebetween which uses a machined flat rail surface and a roller follower, with a second roller follower having mating grooves and ridges configured relative to the surface of the flat rail. A generally C-shaped rail with parallel surfaces interconnects the carriages in a manner that accommodates movably shifting the two carriages in a precise, parallel path.

The present invention provides an arrangement for guiding the mirror carriages of a scanner device with a number of advantages over the more traditional use of a precision shaft. First, it is difficult to maintain straightness over the entire length of a shaft. Second, a precision shaft is considerably more expensive than a machined sheet metal stamping. Third, it is more difficult to maintain parallelism with two separate shafts. Fourth, the contact stress between the shaft and bearings is extremely high due to a point rather than line contact as with the disclosed system. The design of the present invention uses a stamping on each side of the mirror carriages. These stampings are mounted onto machine surfaces in a casting, and located using dowel pins which are pressed into the casting.

Those having normal skill in the art will recognize the foregoing and other objects, features, advantages and applications of the present invention from the following more detailed description of the preferred embodiments, as illustrated in the accompanying drawings.

BRIEF DESCRIPTION OF THE DRAWINGS

FIG. 3 is an end view of the dual carriage structure useful in the FIG. 1 and 2 structure with mounting pursuant to this invention.

FIG. 4 is an expanded view of the groove and roller ridge engaging structure of FIG. 3.

DETAILED DESCRIPTION OF THE PREFERRED EMBODIMENT

Figure 1:
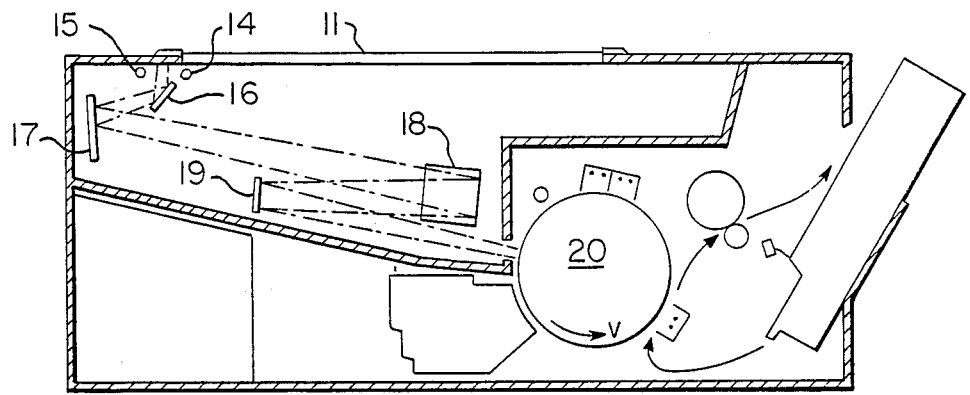
FIG. 1 is a general, schematic view of a typical copier environment illustrating the general location and operation of dual scanning carriages.

FIG. 1 is a somewhat schematic view of a typical contemporary copier 10 showing the relationship of its transparent platen 11 on which documents are positioned for copying. It includes lamps 14 and 15 to illuminate documents (not shown) in position on platen 11. Copier 10 employs a folded optics system wherein reflected light is directed towards mirrors 16 and 17 each mounted on a respective carriage (not shown in FIG. 1), reflective lens 18 and mirror 19. The latter two elements are fixed in position.

After light reflects from mirrors 16 and 17 contained on the two carriages, it is directed to a photoconductor material on rotating drum 20, which is imaged by selective discharge of the charged photoconductor in a well known manner. The image is ultimately toned within the machine and the toned image transferred to a copy sheet after which it is fixed, or fused, onto a copy media.

The particular dual carriage arrangement of copier 10 is such that the carriage for mirror 17 moves at half the speed of the carriage for mirror 16 as they scan platen 11 in synchronization with the movement of the photoconductor surface for drum 20. The operation of copier 10 and its elements are well known but form a particularly advantageous environment for utilization of the present invention.

Figure 2:
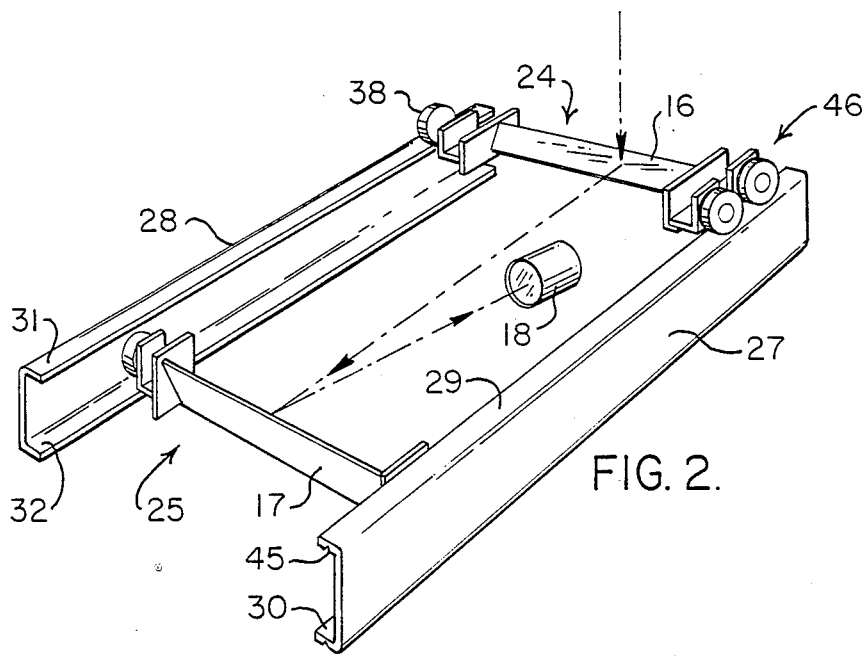
FIG. 2 is an isometric view of the two carriages typically useable in the FIG. 1 environment, and generally showing the relationships of the guide rails and carriage mounts in accordance with the present invention.

FIG. 2 is an isometric view of the relationship of mirrors 16 and 17 to their respective carriages 24 and 25 with respect to carriage mounting rail assemblies 27 and 28. Rail assemblies 27 and 28 are rigidly attached to the machine frame (not shown in FIG. 2). The light path after reflection from the document on platen 11 (shown in FIG. 1) as it is directed by mirrors 16 and 17 into fixed lens 18 is likewise shown. The mounting of carriages 24 and 25, with respect to the surfaces 29/30 and 31/32 of respective rail assemblies 27 and 28, are described below for FIGS. 3-5. By a conventional mechanism, carriage 25 moves at one-half the velocity of carriage 24 to maintain an effectively constant length of light path.

The present invention is particularly useful for a copier with an optic system along the lines of that described above. It involves a design of the rails used for mounting carriages 24 and 25 to accommodate movement thereof, such as for guiding the two mirror carriages back and forth during scanning operations.

The rail assemblies 27 and 28 for carriages 24 and 25, in accordance with the present invention, each include upper and lower flat rail surfaces 29 and 30 for rail assembly 27, and flat rail surfaces 31 and 32 for assembly 28. Note that the two carriages 24 and 25 ride on different surfaces. Parallelism is preserved by a web which maintains a rigid interrelationship between surfaces 29 and 30 on one end, and 31 and 32 on the other. This is achievable, for instance, by forming the two flat rails out of a single bar with a C-shaped cross section. The two rail surfaces are machined in the same machining operation to preserve exact parallelism therebetween as well as an exact dimension.

The carriages are mounted on rollers which roll across rail surfaces 29, 30, 31, and 32, thus minimizing friction since there is no point contact, as in the prior art. These include rollers 33, 34 and 35 on the left end of carriage 24 in FIGS. 3 and 5 and roller 38 on the other end. Similarly, rollers 41, 42 and 43 (43 not shown) provide mounting for carriage 25. Although roller 43 is not visible in the drawings, it is readily apparent that it corresponds to roller 35 of carriage 24. The rollers are rotatably attached to the respective carriages and roll on the rail so that they do not wear, thereby preserving the dimensional stability of the arrangement over the life of the machine.

FIG. 4 shows the detail of groove 45 to provide accurate tracking operations as the carriages roll down the rails. Grooves are machined into the bottom of each rail, and the carriages carry a roller adapted to fit into the grooved track. In FIG. 4, groove 45 is machined into the lower surface of upper rail 29, and roller 34 has a raised ridge to fit into groove 45. In this manner, the motion of the carriages is maintained stable from back-and-forth vibration.

Figure 5:
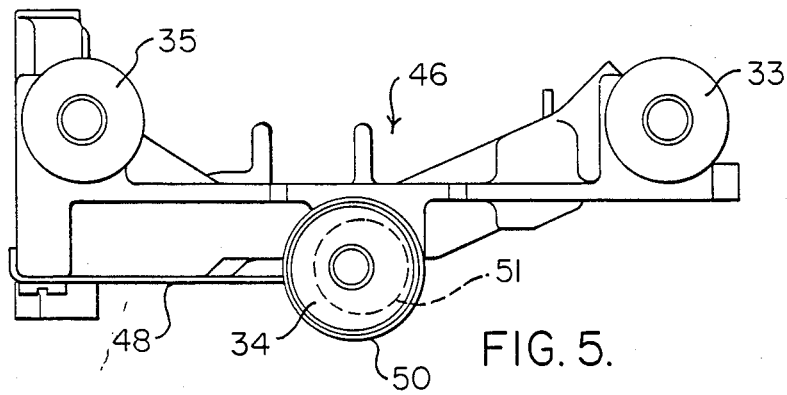
FIG. 5 is a side view of the bearing mounts of the FIGS. 1-4 embodiment.

The end mounting assembly 46 for carriage 24 is shown in FIG. 5. Roller 34 is seen as a standard bearing with a special collar 50 ridged to engage the groove 45. Roller 34 is also attached to an eccentric shaft 51. Roller 34, with its collar 50, is spring loaded by flat metal spring 48 to keep the carriage from jumping off the rail, as well as for wear compensation of the rails with life. Roller 34 is biased upwardly by spring 48 which loads roller 34 such that any wearing of the grooved roller or the grooved track has no bearing on the ability of the mechanism to track correctly. Since the carriages are located relative to the top surfaces 29 and 30, any wearing in the grooved track or grooved roller has no significance on the positioning of the carriages during the life of the machine.

The relationship of the groove 45 and the ridge formed by circumferential collar 50 is reversible, of course. That is, the same result is possible by having a ridge extending downwardly where groove 45 is on the underside of rail 29 which mates with a circumferential groove in roller 34. Regardless, the top surfaces ensure that the carriages scan parallel to each other in the rear, whereas the groove and ridge combination tracks the carriages, front to rear.

Finally, the C-shaped flat rail carries a precisely positioned hole, and a precisely positioned slot, to fit over dowels which are located in positioning holes within the frame. In this manner, the rails are positioned into the frame without a need for further adjustment.

Thus, a flat rail with some point contact rollers, in combination with a separate grooved surface for maintaining position of a carriage riding on the rail, is illustrated.

FIG. 3 shows an end view of the design of the present invention. The front rail assembly 27 has top surfaces 29 and 30 ground simultaneously in a parallel grinder setup. Each mirror carriage has two standard bearings in the front (i.e., 33/35 and 41/43) to ride on respective ones of these surfaces. This ensures that the carriages will scan parallel to one another in the front.

FIG. 5 is a view of the left side mounting assembly 46 for carriage 24 shown in FIGS. 3 and 4. This shows the configuration of the bearings used for rollers 33, 34 and 35. As shown in FIGS. 2 and 3, the rail 28 also has top surfaces 31 and 32 ground in the same manner. In addition, the bottom surface of 30 has a machined groove and further stability is possible by incorporating similar machine grooves on the underside of 31 and 32. Each carriage has two standard bearings for rollers 33 and 35 as well as 41 and 43 (not shown) to ride on the top surfaces, and rollers 34 and 42 each with a special collar to ride in the bottom grooves. The special collar has a profile, which is opposite to the profile of the groove. Since the groove is in the bottom surface of the rail, it is less susceptible to contamination. That is, it will not trap dirt, etc.

Figure 6:
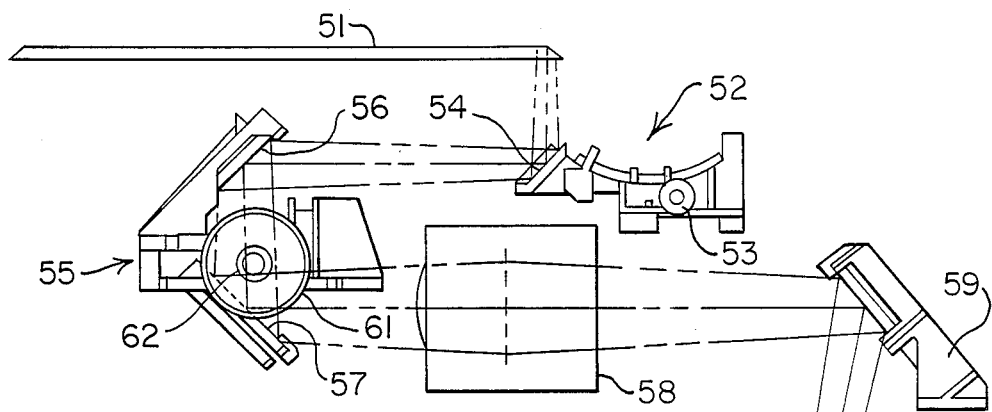
FIG. 6 shows the elements of a four mirror system using dual mirror carriages in accordance with this invention.

FIG. 6 is a dual carriage system somewhat similar to the FIG. 1 arrangement except it incorporates a four mirror configuration. Platen or document glass 51 receives the original document, book or other object for copying. As with FIG. 1, the original object remains stationary as the carriages scan beginning at the reference edge on the right side, as shown in FIG. 6. The first carriage 52 retains the first mirror 54 to reflect the light image received from platen 51 towards the second carriage 55. The light is thereby double reflected by mirrors 56 and 57 through fixed lens 58, and thence is reflected by fixed mirror 59 towards the photoconductor drum 60. Image development and transfer is thereafter substantially as described before.

Single rollers 53 and 62, shown in FIG. 6, function similar to roller 38 shown in FIG. 2 and FIG. 3. They follow respective upper surfaces of a channel member while assemblies along the lines of 46 cooperate with upper surfaces of channel rails on the other side similar to elements 27 and 28 of FIG. 2. Roller 61 freely rotates around a common shaft with drive wheel or sprocket 62. The latter receives a belt, or the like, from a motor (not shown) to provide carriage motivation. The other carriage 52 is either similarly driven, or is coupled with a suitable arrangement to produce the necessary relative motion between carriages 52 and 55. There are several ways for motivating dual carriages similar to those described for producing proper scanning motions. One example is taught in commonly-assigned U.S. Pat. No. 4,634,267 entitled "Photoconductor Scanning Apparatus And Method for Adjustment," by R. O. Jones, W. F. Price, Jr., G. E. Siemer, and M. H. Ulrich.

Although the present invention is described herein with particularity relative to the foregoing detailed description of the exemplary preferred embodiments, those having normal skill in the art will recognize various modifications, changes, additions and applications of the present invention other than those mentioned without departing from the spirit of this invention.

What is claimed is:

1. Apparatus for maintaining a carriage in a precise position comprising:
    a rail having an upwardly facing machined flat upper surface and a downwardly facing lower surface,
    a first roller means rotatably attached to the carriage for rolling engagement of said flat upper surface,
    a second roller means rotatably attached to the carriage, and
    guide means including a mating groove and ridge for engaging the said downwardly facing lower surface of said rail and said second roller means.

2. Apparatus in accordance with claim 1 which further includes means yieldably biasing said second roller in an upwardly direction towards said rail lower surface.

3. Apparatus for maintaining precise positioning between at least two relatively movable carriages comprising:
    an assembly having two parallel, spaced rails each with a flat machined surface and a web rigidly interconnecting said rails,
    first and second roller followers each attached to a respective carriage and in rolling engagement along a path with a respective one of said rail surfaces,
    a third roller follower attached to one of the carriages, and
    a guide means engaging said third roller follower and one of said rails and including a mating groove and ridge configuration for constraining movement of said third roller in a direction parallel to said path of said first and second roller followers,
    whereby the carriages are movably maintained in parallelism without loss of alignment from wear of the engaging elements.

4. Apparatus in accordance with claim 3 which further includes means yieldably biasing said third roller follower towards said one of said rails.

5. Apparatus for maintaining precise positioning between two elongated carriages which are movable parallel to one another in a first direction comprising:
    an assembly having two parallel, spaced rails each with a flat machined surface and a web rigidly interconnecting said rails,
    first and second roller followers each attached to a respective carriage and in rolling engagement with a respective one of said rail surfaces,
    first and second guide rollers each attached to a respective carriage in rolling engagement with the opposite side of the said rail engaged by said first and second roller followers, respectively, and
    first and second guide means engaging each of said guide rollers with a respective said opposite rail side and including respective mating groove and ridge configurations,
    whereby the carriages are movably maintained in parallelism along a path parallel to the first direction.

6. Apparatus in accordance with claim 5 which includes means yieldably biasing said first and second guide rollers towards the associated said rail opposite side.

7. Apparatus in accordance with claim 6 which includes a second assembly having two parallel, spaced rails each with a flat machined surface and a web rigidly interconnecting said second assembly rails, and
    third and fourth roller followers each attached to a respective carriage in rolling engagement with respective said second assembly surfaces and in spaced relation from a respective one of said first and second roller followers.

8. Apparatus in accordance with claim 5 which includes a second assembly having two parallel, spaced rails each with a flat machined surface and a web rigidly interconnecting said second assembly rails, and
    third and fourth roller followers each attached to a respective carriage in rolling engagement with respective said second assembly surfaces and in spaced relation from a respective one of said first and second roller followers.

* * * * *